Oct. 7, 1969  C. E. CAPES ET AL  3,471,267
SPHERICAL AGGLOMERATION PROCESS
Filed Jan. 6, 1966
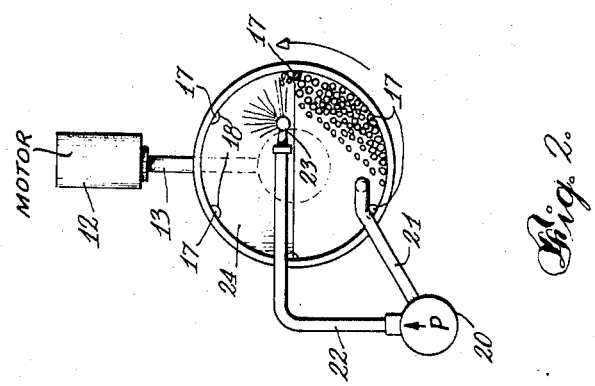
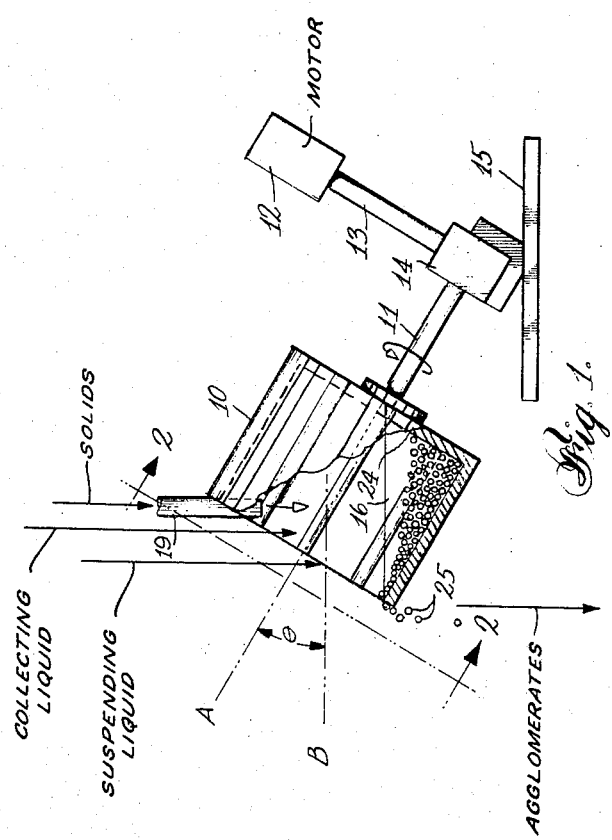
INVENTOR
CHARLES E. CAPES
JOHN P. SUTHERLAND
ALLAN E. McILHINNEY
BY
PATENT AGENT

United States Patent Office 3,471,267
Patented Oct. 7, 1969

3,471,267
SPHERICAL AGGLOMERATION PROCESS
Charles E. Capes, John P. Sutherland, and Allan E. McIlhinney, Ottawa, Ontario, Canada, assignors to Canadian Patents and Development Limited, Ottawa, Ontario, Canada, a company of Canada
Filed Jan. 6, 1966, Ser. No. 519,145
Int. Cl. B01j 2/12, 2/00
U.S. Cl. 23—313                                           3 Claims

ABSTRACT OF THE DISCLOSURE

A finely divided single solid material as distinguished from complexes such as ores is continuously added along with a suspending liquid and an agglomerating liquid immiscible with the first liquid, into a body of these substances in an inclined, open topped, cylindrical vessel rotating about its axis. Agglomerates of the fine solid particles are continuously removed over the lower edge of the open topped tumbling cylinder.

---

This invention relates to a process and apparatus for formation of spherical agglomerates of finely divided solids.

A process for the spherical agglomeration of finely divided solids is described in U.S. patent application Ser. No. 218,571, filed Aug. 22, 1962, now patent 3,268,071 by Ira E. Puddington et al. In this prior process, finely diveded solids in liquid suspension are, if necessary, rendered lyophobic to the suspendant liquid. A binding or bridging liquid is added to the suspension which is then agitated to form the agglomerates.

The agitating vessel may be a reciprocating shaker or the like, and generally is only capable of performing a batch operation.

Furthermore, in the conventional formation of granules, pellets, and the like, considerable difficulty is frequently experienced as a result of powders sticking to the walls of the treating vessel or dish. Thus, it is often difficult to develop desired tumbling and compacting motion in the vessel, more especially with light, sticky powders. Moreover, size control is sometimes lacking as a result of "snowballing" which may occur when the binding liquid is not distributed evenly in the powdered mass.

It is an object of this invention to provide a process and apparatus for producing agglomerates of finely divided solids in a convenient and effective manner and wherein such agglomerates are in a desired size range. In this specification the term "finely divided solid (or solids)" refers to a finely divided solid of a single species rather than to finely divided solids, as in complex ores, since only a single solid is involved.

Another object is to provide a process and apparatus for producing spheroidal agglomerates of finely divided solids in a continuous manner.

The invention resides in a process for agglomerating finely divided solids which comprises feeding said solids into a body of liquid in a cylindrical vessel having an axis inclined to the vertical for suspension therein of said solids, adding to said body a second liquid which preferentially wets said solids and is substantially immiscible with said first liquid, and rotating said vessel to form said solids into agglomerates thereof, the second liquid constituting a binding medium for said agglomerated solids.

The invention also resides in an apparatus for agglomerating finely divided solids comprising an open top cylindrical vessel having its axis inclined at an acute angle to the horizontal, said vessel having a flat interior bottom wall, a cylindrical side wall, and a plurality of ribs mounted on said side wall and extending longitudinally thereof, means for rotating said vessel about its axis, and means for feeding material into said vessel through the open top thereof.

The invention will be described with reference to the accompaniyng drawing, in which FIGURE 1 is a side elevation, partly in section, of an apparatus in accordance with the invention, and FIGURE 2 is a view on line 2—2 of FIGURE 1.

In the drawing, 10 is an open top cylindrical dish or vessel mounted for rotation about its axis on a shaft 11 by means of motor 12, motor shaft 13, and gear box 14. The assembly is mounted on any suitable base 15 whereby the axis A of the vessel is normally disposed at an angle $\theta$ to the horizontal represented by B.

The dimensions of vessel 10 and its angle of tilt are such as to provide a relatively deep corner trough for reception of a body 16 of liquid and suspended solids. Thus, the vessel should have a depth at least as great as its radius, and preferably greater, and the angle $\theta$ will ordinarily be of the order of 30° to 55°.

A plurality of longitudinally extending flights or ribs 17 are mounted on the interior cylindrical wall surface of the vessel. As shown, the ribs have rounded exposed surfaces 18 in order to eliminate the possibility of the formation of dead spaces or pockets on the trailing sides of the ribs during rotation of the vessel. Other suitable configurations or arrangements of the ribs may be employed to avoid such dead space formation. The maximum thickness of the ribs (in the radial direction of the vessel) is relatively quite small. For instance, in a vessel of 3 inch internal radius, a rib of a thickness of $\frac{1}{10}$ inch is satisfactory. Thus, the radial extent of each rib need not exceed $\frac{1}{20}$ of the internal radius of the vessel.

Feed to the vessel is made by means of one or more feeding devices 19. The suspendant liquid may be initially placed in the vessel and the finely divided solids added in dry form later. Alternatively, the solids may be added in the form of a slurry with the same liquid as in the vessel or with other suitable liquids. A collecting liquid which preferentially wets the solids and is immiscible with or slightly soluble in the suspendant liquid is added in the form of a spray, small droplets, or the like.

As previously indicated, feed to the vessel is desirably continuous. The agitation of the suspension as a result of the rotation of the vessel and the effect of the ribs 17 causes the suspended solids to form into agglomerates or spheres 25 held together by the collecting liquid. These agglomerates drop to the bottom of the body 16 where they undergo a tumbling compacting action and are finally formed into dense, compact, and well-defined spheres. The flights 17 assist this action.

As shown in FIGURE 2, means are provided for preventing the solids from clinging to the walls of the vessel. This means comprises a pump 20 having an intake pipe 21 leading from the body of liquid 16 and having an outlet pipe 22 with nozzle 23 for directing a spray of the suspending liquid onto the upwardly travelling portion of the bottom wall 24 of the vessel. This spray of immiscible liquid acts to scour away any solids which may cling to the bottom and side walls.

The agglomerates or spheres grow in size with the continuous addition of fine solids and collecting liquid until they climb up the side of the vessel and finally discharge over the edge, as indicated in FIGURE 1.

It will be understood that conditions of operation such as liquid and solids loading, solids feed rate, vessel angle, speed of rotation, interfacial tension, fineness of original solids, and the like, are controlled whereby the discharged spheres have the desired properties such as size, size distribution, shape, density, smoothness, and so forth.

The produced agglomerates may be subjected to an additional tumbling action in an apparatus such as described herein with a liquid immiscible with the collecting liquid used to bind the produced spheres. This immiscible liquid may be the same as the liquid in the first vessel or another suitable liquid. This additional step serves to further compact the agglomerates, smooth off their surfaces, and render them more closely spherical.

The use of a second liquid which preferentially wets the solids and is immiscible with the binding liquid as an aid to granulation, is of significance. The immiscible liquid acts as a lubricant to help prevent sticking of solids to the inner surfaces of the vessel and aids in allowing proper tumbling and compacting action to develop in the solids load, especially for less dense, sticky solids. Moreover, this immiscible liquid encourages a more uniform distribution of binding liquid throughout the charge thus tending to avoid "snowballing."

The binding agent employed is intended to give the spheres or agglomerates only sufficient wet strength to withstand the tumbling and compacting action. If the binding agent does not give the spheres the required strength in the dried product, further treatment (such as sintering or soaking in a mild solvent for the solid and subsequent drying) may be used to increase the sphere strength.

When an organic suspending liquid is used (with an aqueous binding or collecting liquid) any traces of organic liquid left in the dried product may be useful in reducing caking of the product.

The following examples illustrate the formation of spheres from finely divided solids suspended in an inert liquid in the apparatus described. In each case, a collecting liquid which preferentially wetted the solid and was immiscible with the suspending liquid was added as a spray to cause flocculation and subsequent spherical agglomeration under a tumbling action.

The rotating vessel was a stainless steel beaker, 6 inches in diameter and 4 inches deep. Three $\frac{1}{16}$ inch diameter brass rods were spaced evenly around the circumference of the inside cylindrical wall to act as flights. The vessel was inclined at 40° to the horizontal and was rotated at 100 r.p.m. The experiments were done at room temperature and the saturated aqueous solutions of various salts used as collecting liquids were saturated with the respective salts at room temperature (approximately 25° C).

EXAMPLE I

Potassium chloride spheres

The KCl powder used had a median size of 94 microns and 90% of the particles were in the size range 30 to 187 microns. Twenty grams of the powder were suspended in 200 ml. of a petroleum aliphatic solvent sold under the trade mark "Varsol" in the granulating dish. Eight millilitres of the collecting liquid (saturated aqueous solution of KCl) were sprayed into the tumbling suspension in small increments. While the collecting liquid was being added but after the granule nuclei had formed, an additional 19 grams of dry KCl powder were added in small increments to increase the sphere size. The total agglomeration time was about 20 minutes. Finally, the dish was stopped, the suspending liquid was decanted and the spheres were dryed at 160° C. Forty grams of spherical agglomerates were obtained with a mean size of 6.4 mm., and a size range between 5.7 and 8.0 mm.

EXAMPLE II

Sodium chloride spheres

The NaCl powder used had a median size of 90 microns and 90% of the particles were in the size range 45 to 185 microns. Twenty grams of the powder were suspended in 200 ml. of "Varsol" in the granulating dish. Nine millilitres of the collecting liquid (saturated aqueous solution of NaCl) were sprayed into the tumbling suspension in small increments. While the collecting liquid was being added, but after the granule nuclei had formed, an additional 50 grams of dry NaCl powder were added in small increments to increase the sphere size. The total agglomeration time was about 15 minutes. Finally, the dish was stopped, the suspending liquid was decanted and the spheres were dryed at 160° C. Seventy-one grams of spherical agglomerates were obtained with a mean size of 6.8 mm. and a size range between 4.7 and 9.5 mm.

EXAMPLE III

Methyl methacrylate spheres

The methyl methacrylate powder used had a median size of 25 microns and 90% of the particles were in the size range 12 to 49 microns. Ten grams of the powder were suspended in 200 ml. of hexane in the granulating dish. Twenty-two millilitres of the collecting liquid (a 15 weight percent solution of chloral hydrate in water) were sprayed into the tumbling suspension in small increments. While the collection liquid was being added, but after the granule nuclei had formed, an additional 20 grams of the plastic powder were added in small increments to increase the sphere size. Because the hexane suspending liquid evaporated rapidly during the run, 100 ml. of make-up hexane were added during the run. The total agglomeration time was about 30 minutes. Finally, the dish was stopped, the suspending liquid was decanted and the spheres were dryed at 80° C. Twenty-eight grams of spherical agglomerates were obtained with a mean size of 3.7 mm., and a size range between 1.7 and 8.0 mm.

EXAMPLE IV

Ammonium nitrate spheres

The $NH_4NO_3$ powder used had a median diameter of 69 microns and 90% of the particles were in the size range 39 to 115 microns. Twenty grams of the powder were suspended in 200 ml. of "Varsol" in the granulating dish. Nine millilitres of the collecting liquid (saturated aqueous solution of $NH_4NO_3$) were sprayed into the tumbling suspension in small increments. While the collecting liquid was being added but after the granule nuclei had formed, an additional 20 grams of dry $NH_4NO_3$ powder were added in small increments to increase the sphere size. The total agglomeration time was about 20 minutes. Finally the dish was stopped, the suspending liquid was decanted and the spheres were dryed at 80° C. Forty-one grams of spheres were obtained with a mean size of 3.7 mm., and a size range of 2.8 to 5.7 mm.

We claim:

1. A process for agglomerating a finely divided solid of a single species which comprises continuously forming a suspension of said finely divided solid in a first and continuously added suspending liquid in a cylindrical vessel having an open upper end and an axis inclined to the vertical, continuously adding a second liquid to said suspension, said second liquid preferentially wetting said suspended fine solid and being substantially immiscible with said first liquid, rotating said vessel at a speed sufficient to cause tumbling of said suspension and formation of agglomerates of said finely divided solid, said second liquid constituting a binding medium for said agglomerates, and continuing said rotation of said vessel until the entire quantity of said solids in said vessel has been formed into agglomerates of uniform size and continuously removing said agglomerates.

2. A process for agglomerating finely divided solids as defined in claim 1, including the additional steps of placing said discharged agglomerates in a second cylindrical vessel having an axis inclined to the vertical, adding to said agglomerates in said second vessel a liquid immiscible with said second liquid, and rotating said second vessel to cause tumbling of said agglomerates and liquid therein and further compacting of said agglomerates.

3. A process for agglomerating a finely divided solid which comprises continuously feeding said finely divided solid of a single species into a body of a suspending liquid in an open topped cylindrical vessel having an axis inclined to the vertical for suspension therein of said finely divided solid, continuously adding to said body said suspending a second agglomerating liquid which later preferentially wets said finely divided solid and is substantially immiscible with said suspending liquid, rotating said vessel to form said finely divided solid into agglomerates thereof, the second liquid constituting a binding medium for said agglomerates, and pumping a portion of said suspendant liquid along with suspended material from said vessel and spraying said withdrawn liquid onto a wall of said vessel to wash clinging solid particles therefrom and continuously discharging formed agglomerates over the open edge of said vessel.

References Cited

UNITED STATES PATENTS

| | | |
|---|---|---|
| 1,528,851 | 3/1925 | Rodling et al. _____ 23—313 X |
| 1,585,755 | 5/1926 | Borcherdt _____ 209—5 X |
| 2,544,752 | 3/1951 | Gelbman _____ 264—117 X |
| 3,268,071 | 8/1966 | Puddington _____ 209—5 |
| 3,306,729 | 2/1967 | McPherson et al. |
| 2,699,381 | 1/1955 | King. |

NORMAN YUDKOFF, Primary Examiner

J. SOFER, Assistant Examiner

U.S. Cl. X.R.

259—3